United States Patent [19]

Zehrung, Jr.

[11] 4,028,868

[45] June 14, 1977

[54] TOWABLE LAWN COMBER

[75] Inventor: Claude D. Zehrung, Jr., Lakewood, Colo.

[73] Assignee: Bluebird International, Inc., Englewood, Colo.

[22] Filed: Feb. 23, 1976

[21] Appl. No.: 660,109

[52] U.S. Cl. .................... 56/17.2; 56/12.7; 56/320.1; 56/504; 280/43.2

[51] Int. Cl.² .............................. A01D 35/24

[58] Field of Search ............... 56/12.7, 504, 17.1, 56/17.2, 505, 15.9, 7, 249, DIG. 10, DIG. 14, 320.1, 320.2; 280/43, 43.2

[56] References Cited

UNITED STATES PATENTS

| | | | |
|---|---|---|---|
| 2,833,102 | 5/1958 | Roof | 56/17.1 X |
| 3,203,160 | 8/1965 | Thomas | 56/504 X |
| 3,433,003 | 3/1969 | Musgrove | 56/12.7 X |
| 3,537,720 | 11/1970 | Irgens | 56/17.2 X |
| 3,770,064 | 11/1973 | Scarnato et al. | 56/504 X |

Primary Examiner—J.N. Eskovitz
Attorney, Agent, or Firm—Van Valkenburgh and Lowe

[57] ABSTRACT

A towable, wheel-mounted yard maintenance apparatus which may be a lawn comber having impact arms, a lawn mower having a cutting reel, or a sweeper having a cylindrical brush. The working elements, for example the impact arms, are carried upon a shaft within a transverse housing. This housing and the wheels are carried within the embrace of a structural frame. The frame extends in front of, and a short distance beyond each side of the housing to serve as a bumper which prevents the housing from coming too close to an obstruction such as a post or a tree. The frame also protects the wheels from such obstructions. The rear end of the housing is pivoted to the frame and the front end is attached to the frame by a height-adjustment linkage actuated by an adjusting screw which is locked in place whenever the height of the unit is proper for operation.

6 Claims, 5 Drawing Figures

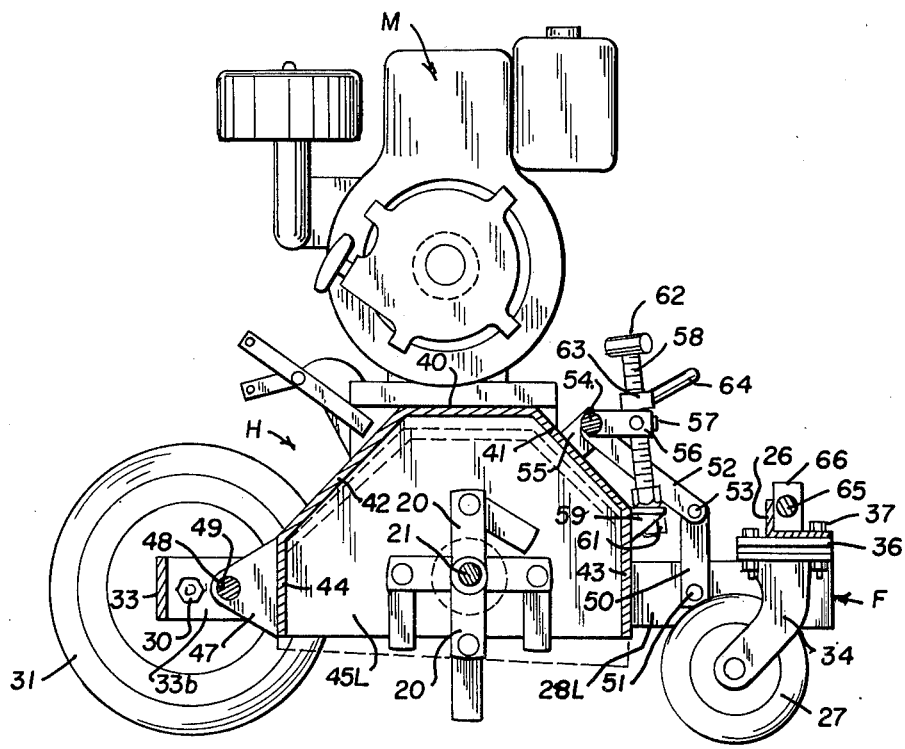
Fig. 3
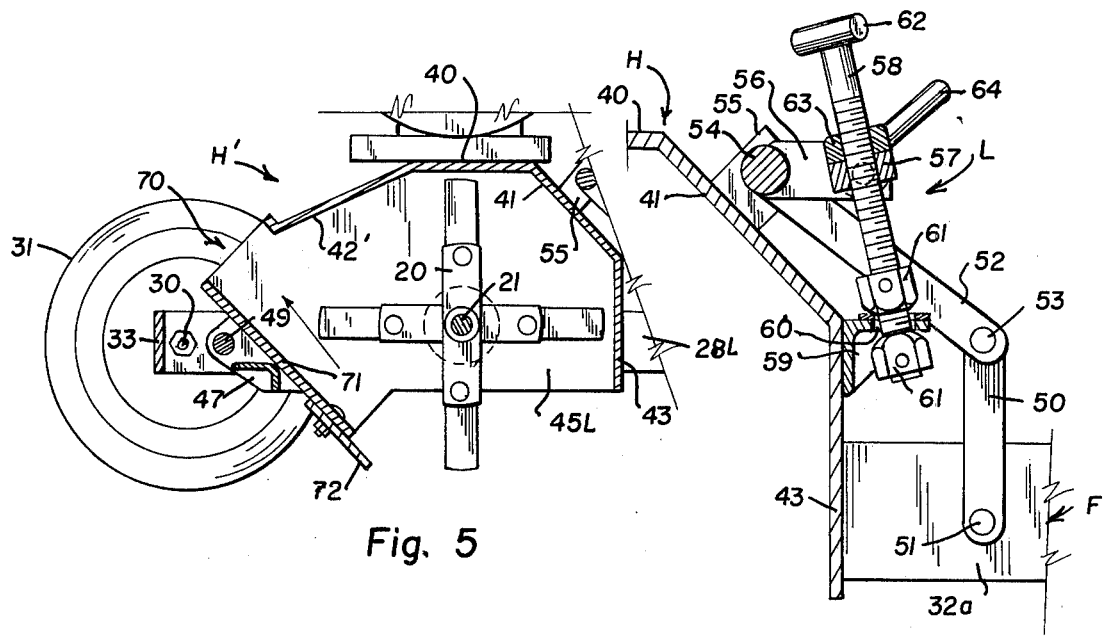
Fig. 5
Fig. 4

TOWABLE LAWN COMBER

The present invention relates to yard maintenance apparatus of the type having its working elements carried upon a powered, rotating shaft. Such apparatus will include lawn combers, lawn mowers and sweepers. The invention is more particularly concerned with such yard maintenance apparatus which is adapted to be towed, as by a tractor and is especially suitable for large yards and other kept areas such as golf courses.

The present invention is herein described as a lawn comber and will be called a "Towable Lawn Comber," but it is apparent that the invention can be a lawn mower by changing the working elements, that is, by changing the impact arms on the shaft to a cutting reel. The invention can also be a sweeper by changing the impact arms on the shaft to a cylindrical brush. Thus, the description of a lawn comber, as set forth therein, is not to be considered as a limitation to the invention.

An object of the invention is to provide a novel and improved powered lawn comber which is especially adapted to be towed by a tractor to condition a yard or like area by breaking up clumps of grass, clods of earth and cutting out dense, intertwining root growths and runners.

Another object of the invention is to provide a novel and improved towable lawn comber which may be built in large sizes suitable for commercial use without detracting from the effectiveness of the unit.

Another object of the invention is to provide a novel and improved towable lawn comber which includes a peripheral frame structure which extends laterally a short distance beyond each side of the array of lawn comber impact arms to serve as a bumper and as a guide to keep the impact arms a short distance away from tree trunks, building corners, posts and similar objects which could be damaged by the impact arms.

Another object of the invention is to provide a novel and improved lawn comber having a simple, easily-adjusted arrangement for enclosing and for raising and lowering the working elements, the impact arms, to permit the impact arms to be held above the ground surface when not working, and to be lowered to selected depths into the ground when they are working.

Another object of the invention is to provide a novel and improved lawn comber having an easily adjusted arrangement for raising and lowering the working elements, the impact arms, which includes simple, effective and reliable locking members to prevent vibration of the unit from shifting the working elements once they are locked in position.

Another object of the invention is to provide a novel and improved lawn comber which is constructed with its several components integrated in a simple, effective manner and which is a neat-appearing, economical, rugged and durable unit.

With the foregoing and other objects in view, the present invention comprises certain constructions, combinations and arrangements of parts and elements as hereinafter described, defined in the appended claims, and illustrated in preferred embodiment by the accompanying drawings in which:

FIG. 3 is a longitudinal section as taken from the indicated line 3—3 at FIG. 2.

FIG. 4 is a fragmentary sectional detail as taken from the indicated line 4—4 at FIG. 1, but on an enlarged scale.

FIG. 5 is a fragmentary sectional detail similar to a portion of the showing at FIG. 3, but illustrating the use of a discharge chute at the rear side of the machine which may receive the mouth of a debris bag.

Figure 1:
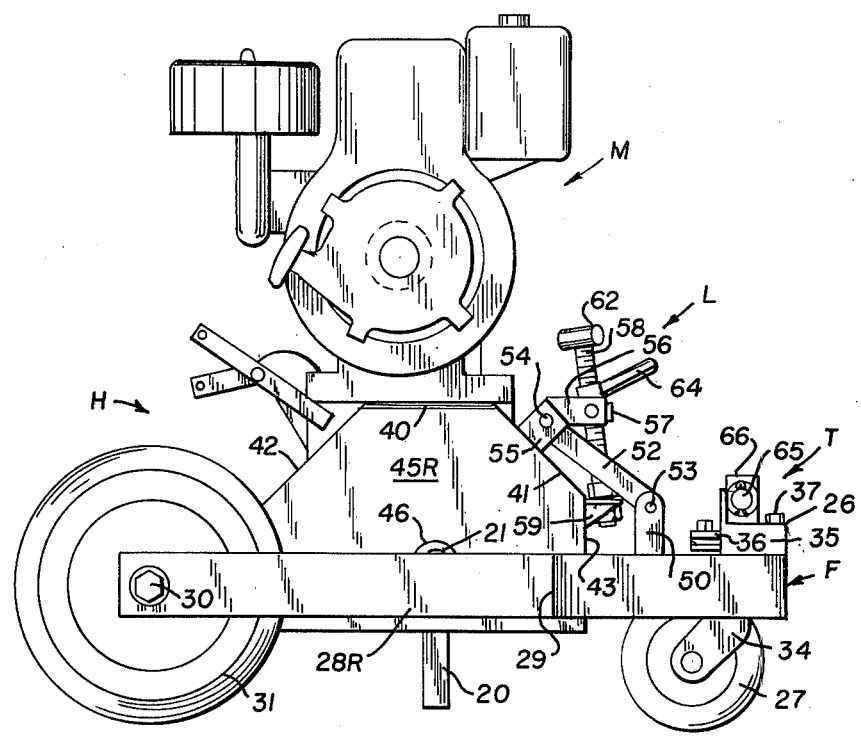
FIG. 1 is a right-side, side elevational view of the invention.

Referring more particularly to the drawing, the towable lawn comber, as illustrated at FIGS. 1 – 4, is a wheel mounted unit having a transversely elongated, open-bottom hood H supported within the embrace of a frame F. The working elements of the comber within this hood include a transverse array of articulated impact arms 20 carried upon a shaft 21 which projects from one side of the hood. A motor M, mounted on top of the hood at the side above the projection of shaft 21, drives the lawn comber working elements. The output shaft 22 of this motor M is connected to the projecting end of the shaft 21 by a belt 23 carried upon pulleys 24 and 25 on the respective drive and comber shafts. The rearward end of the hood is pivotally connected to the rear of the frame F and an elevational adjustment linkage L connects the front end of the hood H with the front end of the frame F. Actuation of the linkage L thus tips the hood to raise or lower the working elements of the comber with respect to the frame and the ground surface supporting the comber. Accordingly, the hood is raised to lift the impact arms 20 above the ground surface so that the comber may idle and be lowered to engage the impact arms 20 with the ground surface when the comber is working. To complete this organization, a tow bar connector T is provided at the front of the unit, all as hereinafter described in detail.

The frame F extends completely about the hood and includes a front transverse structural angle 26 positioned forwardly of the hood a distance sufficient to provide clearance for front caster wheels 27, depending from this angle 26 as hereinafter further described. The length of this angle 26 is approximately the same as the width of the hood H. Left and right side bars 28L and 28R extend rearwardly and flare outwardly from each end of this front angle 26 to a bend point 29 located a short distance behind the leading edge of the hood and also, a short distance outwardly from each side of the hood. Thence, each side bar, 28L and 28R, extends rearwardly paralleling the longitudinal axis of the comber to a rearward terminal point a short distance behind th hood. A mounting axle 30, to carry a rear wheel 31, is located at the rear end of each side bar 28L and 28R. Each rear wheel 31 is positioned laterally of the hood, in the space formed by the outflared front portion of the side bar 28L and 28R, and the greater portion of the wheel 31 is behind the hood as hereinafter further described. The outflared front portions of the side bars 28L and 28R, to place the side bars a short distance away from the sides of the hood, provide for a sloping, deflecting side edge to help deflect the comber laterally should it be pulled too close to a tree trunk, post, or the like, for it is desirable to keep the working elements of the comber a short distance away from the trees, posts and similar obstructions.

Figure 2:
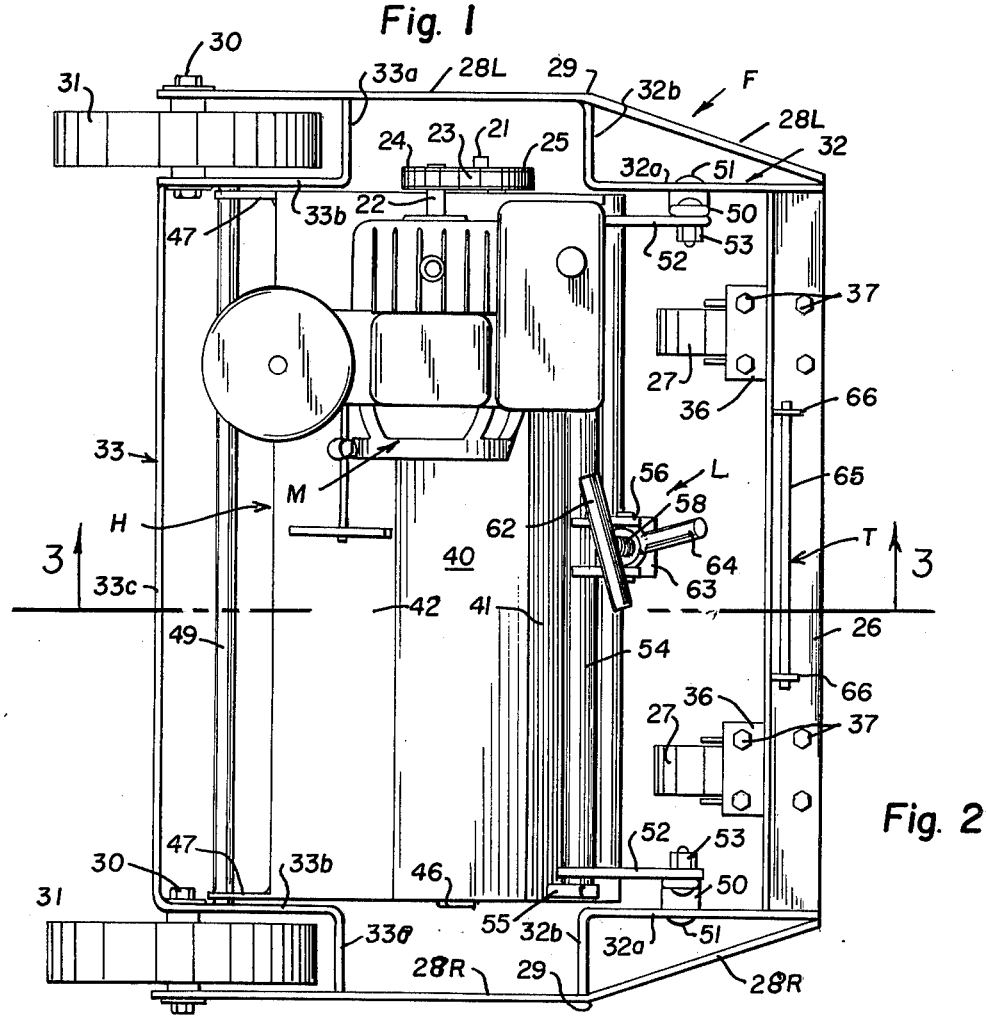
FIG. 2 is a plan view of the invention.

To reinforce each side bar, a filler bracket 32, formed as an angle bar having unequal leg lengths, is provided within each outflared front portion of each side bar, 28L and 28R, with the longer leg length 32a of the bracket extending rearwardly and longitudinally from an end of the front angle 26 to lie alongside the adjacent front corner portion of the hood H. The shorter leg length 32a turns outwardly therefrom to connect with its side bar at the bend point 29. A rear bar 33 connects each side bar 28L and 28R and is formed as a hat-shaped section, that is, each end of the bar 33 is an outer, short leg portion 33a which connects with a side bar 28L or 28R at a point in front of the wheels 31. The bar 33 then turns from each leg 33a to form an intermediate section 33b which extends rearwardly and parallel to the adjacent side bar 28L or 28R. The front portion of this intermediate section 32B lies alongside the adjacent rear corner of the hood H and the rear portion of the intermediate section extends rearwardly to the rear point of the adjacent side bar, 28L or 28R. Thence, the central portion 33c of the rear bar 33 extends transversely across the unit to interconnect the rear ends of the intermediate portions 33b, all as best shown in FIG. 2. Accordingly, the rear end of each side bar, 28L or 28R, and the connecting outer leg portion 33a and intermediate portion 33b of the rear bar form a pocket wherein a rear wheel 31 is protectively mounted on its axle 30, which extends through both the side bar and the intermediate portion 33b of the rear bar as best illustrated at FIG. 2.

The diameter of the rear wheel 31 may be 12 inches or such, and it will place the lower edge of the frame approximately four inches above the ground surface, but the wheel diameter and corresponding height of the frame F may be varied to correspond with other components of the lawn comber.

The front wheels 27 are caster wheels which permit the lawn comber to be easily towed without binding against the ground surface whenever turning a corner. These caster wheels are smaller than the rear wheels having, for example, a diameter of 6 inches, and they will include a conventional swivel mount 34. It is thus necessary to elevate the front angle bar 26 several inches above the level of the side bars 28L and 28R to accommodate the wheels and their swivel mounts. The front angle 26 is oriented with a horizontal leg as a base and an upstanding vertical leg at the rearward side of the base leg. Each end of the lower leg is turned downwardly as at 35, to lie against the inner side of the adjacent filler bracket leg 32a as illustrated in broken lines at FIG. 1. This permits these components, the downturned ends 35, the filler bracket legs 32a and the front end of the side bar 28L and 28R to be securely welded together into a strong, solid structure. Each caster wheel mount 34 is attached to a plate 36 secured to the underside of the base leg of the front angle as by bolts 37. The caster wheels are spaced inwardly from the ends of the front angle 26 a distance sufficient to permit them to swing freely when the comber is being turned.

The hood H is formed as a transversely elongated, inverted, trough-shaped unit including a central, flat, transversely elongated top 40 at the center, a transverse, downwardly sloping front top portion 41 and a transverse downwardly sloping rear top portion 42. A transverse front wall 43 depends from the front sloping portion 41 and a transverse rear wall 44 depends from the rear sloping portion 42 to complete the inverted trough from. Each side end of the hood is closed by an end wall, 45R or 45L, which carries a bearing 46 wherein the comber shaft 21 is mounted. This hood is proportioned and the bearings 46 are located such as to permit the comber arms 20 to rotate upon the shaft 21 within this hood and extend below the hood a distance sufficient for easy engagement with the ground surface.

Each end wall of the hood includes an ear 47 extending rearwardly of the rear side wall 44 and an orifice 48 in each ear is fitted upon a transverse shaft 49 mounted in the intermediate section 33b of the rear cross bar 33 adjacent to the wheel mount axle 30. The hood H may be tipped about this shaft 49 to lower and raise it with respect to the frame for height adjustment of the impact arms 20 as heretofore mentioned.

The adjustment linkage L, connecting the front end of the hood H with the frame F, includes an upright support link 50 at each side of the frame, with each link having its lower end connected to the longitudinal leg 32a of the filler bracket 32 by a pivot connection 51 a short distance forwardly of the forward edge of the frame. A swing arm 52 is connected to the top of each link 50 by a pivot connection 53 to extend thence upwardly and rearwardly to connect with a common transverse shaft 54. This shaft is mounted in pivot ears 55 upstanding from each end of the front, inclined top portion 41 of the hood H. A pair of lever arms 56 outstand from the center of the shaft and they are spaced apart a distance sufficiently to carry a swivel nut 57. A threaded adjusting screw 58 extends through this swivel nut 57 and thence downwardly to an abutment 59 at the front side wall 43 of the hood directly below the lever arms 56. The abutment 59 includes an orifice 60 through which the lower end of the adjusting screw 58 extends and the lower end of the adjusting screw is held in this orifice with a free fit by locks nuts 61 at each side of the abutment. These lock nuts bear against the abutment and suitable anti-friction washers may be used between the lock nuts and the abutment surface to make the adjusting screw easier to turn.

A handle 62 is provided at the top of the adjusting screw 58 to permit it to be easily turned. To complete the assembly, a lock nut 63 is provided on this adjusting screw 58 immediately adjacent to the swivel nut 57 to bear against the swivel nut and lock the adjustment screw in place. A handle 64 on the lock nut renders it easy to set. The operation of this adjustment linkage L is apparent from the foregoing description and is further indicated at FIGS. 3 and 4. By turning the adjusting screw 58 on the swivel nut 57, the lever arms rotate the shaft 54 to lower or raise the swing arms 52 bearing against the connection at the frame link 50. The resulting tipping of the hood H is illustrated in broken lines at FIG. 3. This lowering and raising of the hood thus engages the impact arms 20 with the ground surface or raises these arms above the ground surface when the machine is to idle as heretofore described.

To complete this organization, a tow bar connector T is provided at the center portion of the front angle bar 26. This tow bar connector is illustrated as a transverse rod 65 carried in a pair of upstanding brackets 66. As such, the connector is adapted for a T-shaped tow bar, not shown, having a transverse, tubular end which will fit over the rod and will tend to hold the tow bar in alignment in a vertical plane through the longitudinal axis of the unit. However, the tow bar may pivot vertically about the rod 65 whenever the comber is being towed over uneven ground. It is to be noted that this tow bar connector may be varied from the construction described since other standard types of the towing devices may be used, providing, however, that the tow bar may pivot vertically about the connector as described.

The operation of this lawn comber is manifest from the foregoing description. When the comber is connected to a tractor by a tow bar, the motor M is started to initiate rotation of the shaft 21 and impact arms 20. Initially, the hood and the impact arms within it will be at an elevation above the ground surface so that the comber can be towed as from a storage space to a yard which is to be combed. The hood is then lowered until the impact arms 20 dig into the ground to a desired depth. This is done by turning the adjusting screw 58 and then locking the lock nut 61 so that it will not thereafter shift from the desired setting.

FIG. 5 indicates, in a somewhat diagrammatic manner, a modified arrangements where a chute 70 is formed at the back of the hood H' to permit debris to be thrown by the impact arms 20 through the chute and into a bag, not shown, which may be attached to the chute 70. This chute 70 simply replaces a portion of the rear wall 45 of the hood previously described, and instead, the chute is formed as a sloping bottom plate 71 extending forwardly and downwardly towards the ground surface. An adjustable pickup plate 72 may be attached to the lower end of this bottom plate 71 to place its leading edge very close to a ground surface when the comber is in operation, thereby permitting the unit to throw all materials through the chute rather than throwing some of the material rearwardly underneath the apparatus as does occur with an arrangement such as that illustrated at FIGS. 1 – 4. Aside from the construction of the chute which also requires modified end walls 45L' and 45R' and a modified rear downsloping top portion 42', the unit shown at FIGS. 1 – 4 and that shown at FIG. 5 are essentially identical.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. In a towable yard maintenance apparatus connectable to a tow bar which includes a transversely disposed powered shaft carrying rotatable working elements, with the shaft being supported in bearings at opposite end walls of an openbottom transverse hood, the improvement comprising:
   a. a wheel mounted frame structure embracing the hood, having a front member in front of the hood whose width is essentially the same as the width of the hood;
   b. side members having forward portions extending rearwardly and outwardly from the ends of the front member and rearward portions extending alongside and rearwardly beyond the ends of said hood, with each side member forming a deflector to engage and to deflect the maintenance apparatus around obstructions encountered as the apparatus is being towed, and with the rearward portion of each side member being spaced laterally and outwardly from the adjacent end wall of the hood to space the working elements away from the base of an obstruction which may be encountered;
   c. front caster wheels underneath the front member supporting the front end of the frame;
   d. rear wheels supporting the rear end of the frame mounted within structural pockets in the aforesaid side spaces formed by placing the side members laterally and outwardly from the adjacent end wall of the hood whereby to protect the rear wheels from engagement with obstructions alongside the apparatus;
   e. means to lower and raise the hood and working element therein with respect to the frame and
   f. a transversely axised tow bar connector at the front member permitting a tow bar connected thereto to swing in a vertical plane whereby the apparatus will ride upon the front and rear wheels at all times as it is pulled over uneven ground.

2. The apparatus defined in claim 1, wherein:
   each of said pockets is formed by the inward face of a side frame member, and
   a hat-shaped, rear frame member with comparatively short ends of the rear frame member forming the front of the pockets;
   longitudinal intermediate sections of the rear frame member forming the sides of the pocket; and
   a central section of the rear frame member extending across the rear of the frame between the pockets.

3. The apparatus defined in claim 1, wherein the means to lower and raise the hood and working element therein includes:
   a. a transverse pivot means connecting the rear of the hood with the frame, whereby the front end of the hood may be tipped upwardly and downwardly about this pivot;
   b. a linkage connecting the front of the hood to the front of the frame and to articulate as the front of the hood moves upwardly and downwardly including a pair of members which spread apart and come together; and
   c. a lead screw means between the said part of members adapted to forcibly urge them together and apart.

4. In the apparatus defined in claim 3, wherein said linkage includes:
   a transverse shaft rotatably mounted onto the hood;
   a first bar pivotally attached to the frame mounted in a generally upright position;
   a rocker arm having one end pivotally attached to the upper end of said bar and the other end connected to said transverse shaft;
   a pair of lever arms outstanding from the shaft carrying a swivelled nut;
   an abutment at the hood in alignment with the lever arm movement; and
   said lead screw means extending through the swivelled nut and connecting with the abutment, whereby to move the lever arms with respect to the abutment by rotation of the lead screw in the swivelled nut.

5. In the apparatus defined in claim 4, including a lock nut on the lead screw adjacent to the swivelled nut to lock the lead screw at any selected position.

6. In the apparatus defined in claim 1, wherein:
   said means to lower and raise the hood and working element therein includes a shaft extended transversely across the rear of the frame behind the hood, with each end connecting with a rear frame member; and
   a rearwardly extended ear at each side of the hood connected with and pivoted about said shaft, whereby swinging of the hood about the shaft lowers and raises the hood; and
   a linkage means at the front of the hood connecting with the frame, and means to actuate the linkage means to lower and raise the front of the hood.

* * * * *